(12) United States Patent
Padebettu et al.

(10) Patent No.: US 12,317,352 B2
(45) Date of Patent: May 27, 2025

(54) LOCAL BREAKOUT FOR CUSTOMER PREMISE EQUIPMENT IN A 5G WIRELESS WIRELINE CONVERGENCE AT AN ACCESS GATEWAY FUNCTION

(71) Applicant: Juniper Networks, Inc., Sunnyvale, CA (US)

(72) Inventors: Venkatesh Padebettu, Bangalore (IN); Jamuna S. V, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 420 days.

(21) Appl. No.: 18/045,872

(22) Filed: Oct. 12, 2022

(65) Prior Publication Data

US 2024/0129974 A1 Apr. 18, 2024

(51) Int. Cl.
| | |
|---|---|
| *H04W 76/15* | (2018.01) |
| *H04W 36/00* | (2009.01) |
| *H04W 36/30* | (2009.01) |
| *H04W 76/12* | (2018.01) |

(52) U.S. Cl.
CPC ..... *H04W 76/15* (2018.02); *H04W 36/00837* (2018.08); *H04W 36/30* (2013.01); *H04W 76/12* (2018.02)

(58) Field of Classification Search
CPC ........... H04W 76/15; H04W 36/00837; H04W 36/30; H04W 76/12; H04W 76/25; H04W 92/24; H04W 76/19; H04W 4/50; H04W 76/10
See application file for complete search history.

(56) References Cited

U.S. PATENT DOCUMENTS

| | | | | |
|---|---|---|---|---|
| 2019/0124013 A1* | 4/2019 | Murugesan | ............. | H04L 45/76 |
| 2021/0250788 A1* | 8/2021 | Kim | ....................... | H04W 24/04 |

FOREIGN PATENT DOCUMENTS

WO    WO-2020191058 A1 * 9/2020    ............. H04L 5/001

OTHER PUBLICATIONS

3GPP Huawei, "Key Issues on Supporting Wireline and Wireless Independent Core Network, "3GPP-BFF Workshop: Feb. 2017, pp. 1-7.
Extended European Search Report for Application No. EP23155489.0, mailed on Aug. 21, 2023, 13 pages.
(Continued)

*Primary Examiner* — Chi H Pham
*Assistant Examiner* — Samuel Dilan Rutnam
(74) *Attorney, Agent, or Firm* — Harrity & Harrity, LLP

(57) ABSTRACT

A network device may enable local breakout for a subscriber device, and may create, for the subscriber device, a primary path to a data network via a user plane function. The network device may create, for the subscriber device, a secondary path direct to the data network and based on the local breakout being enabled, and may determine whether a connection with the user plane function is available. The network device may selectively provide traffic between the subscriber device and the data network via the primary path based on determining that the connection with the user plane function is available, or may provide the traffic between the subscriber device and the data network via the secondary path based on determining that the connection with the user plane function is unavailable.

20 Claims, 10 Drawing Sheets

(56) References Cited

OTHER PUBLICATIONS

Spini M, et al., "KI#2: Sol 21 NSWO support for Wireline," 3GPP TSG-WG SA2 Meeting #152E e-Meeting, Aug. 17-26, 2022, 6 pages. Retrieved from the Internet: [URL:https://www.3gpp.org/ftp/tsg_sa/WG2_Arch/TSGS2_152E_Electronic_2022-08/Docs/S2-2206684.zip] [S2-2206684 e NPN KI#2 sol #21 revision.docx].

* cited by examiner

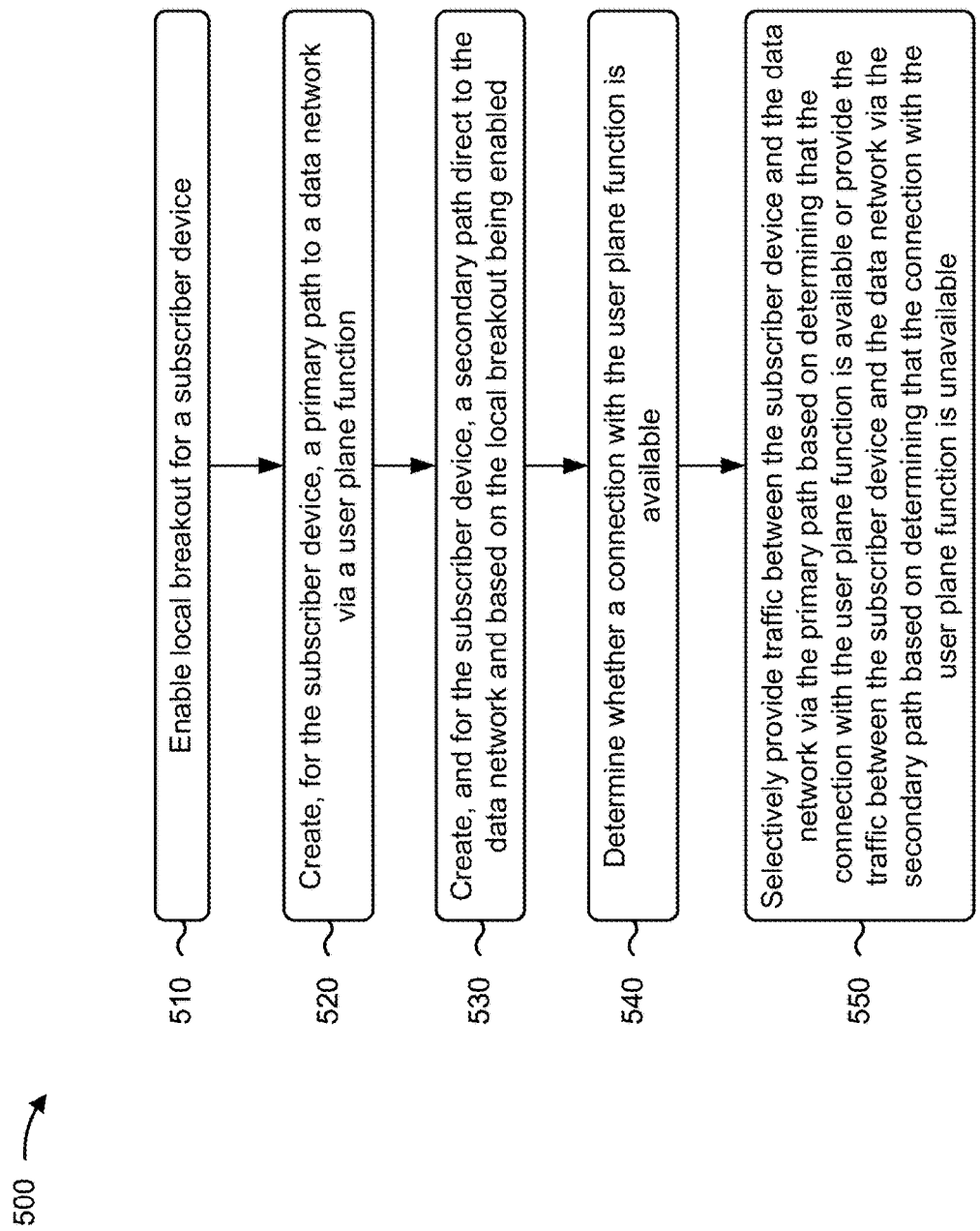

LOCAL BREAKOUT FOR CUSTOMER PREMISE EQUIPMENT IN A 5G WIRELESS WIRELINE CONVERGENCE AT AN ACCESS GATEWAY FUNCTION

BACKGROUND

In wireless wireline convergence, a subscriber (e.g., a customer premise equipment (CPE), such as a residential gateway) is serviced by both an access gateway function (AGF) and a user plane function (UPF) of a fifth-generation (5G) network. The AGF is responsible for providing services such as marking, policing, and shaping, whereas the UPF is responsible for providing services such as accounting and lawful intercept.

SUMMARY

Some implementations described herein relate to a method. The method may include enabling local breakout for a subscriber device, and creating, for the subscriber device, a primary path to a data network via a user plane function. The method may include creating, for the subscriber device, a secondary path direct to the data network and based on the local breakout being enabled, and determining whether a connection with the user plane function is available. The method may include selectively, providing traffic between the subscriber device and the data network via the primary path based on determining that the connection with the user plane function is available or providing the traffic between the subscriber device and the data network via the secondary path based on determining that the connection with the user plane function is unavailable.

Some implementations described herein relate to a network device. The network device may include one or more memories and one or more processors. The one or more processors may be configured to enable local breakout for a subscriber device, and create, for the subscriber device, a primary path to a data network via a user plane function, where the primary path includes a general packet radio service tunneling protocol tunnel between the network device and the user plane function. The one or more processors may be configured to create, for the subscriber device, a secondary path direct to the data network and based on the local breakout being enabled, and determine whether a connection with the user plane function is available. The one or more processors may be configured to selectively provide traffic between the subscriber device and the data network via the primary path based on determining that the connection with the user plane function is available, or provide the traffic between the subscriber device and the data network via the secondary path based on determining that the connection with the user plane function is unavailable.

Some implementations described herein relate to a non-transitory computer-readable medium that stores a set of instructions for a network device. The set of instructions, when executed by one or more processors of the network device, may cause the network device to enable local breakout for a subscriber device, and create, for the subscriber device, a primary path to a data network via a user plane function and a first network interface. The set of instructions, when executed by one or more processors of the network device, may cause the network device to create, for the subscriber device, a secondary path direct to the data network via a second network interface different than the first network interface and based on the local breakout being enabled, and determine whether a connection with the user plane function is available. The set of instructions, when executed by one or more processors of the network device, may cause the network device to selectively provide traffic between the subscriber device and the data network via the primary path based on determining that the connection with the user plane function is available, or provide the traffic between the subscriber device and the data network via the secondary path based on determining that the connection with the user plane function is unavailable.

BRIEF DESCRIPTION OF THE DRAWINGS

FIG. 5 is a flowchart of an example process for providing local breakout for CPE in a 5G wireless wireline convergence at an AGF.

DETAILED DESCRIPTION

Figure 1A:
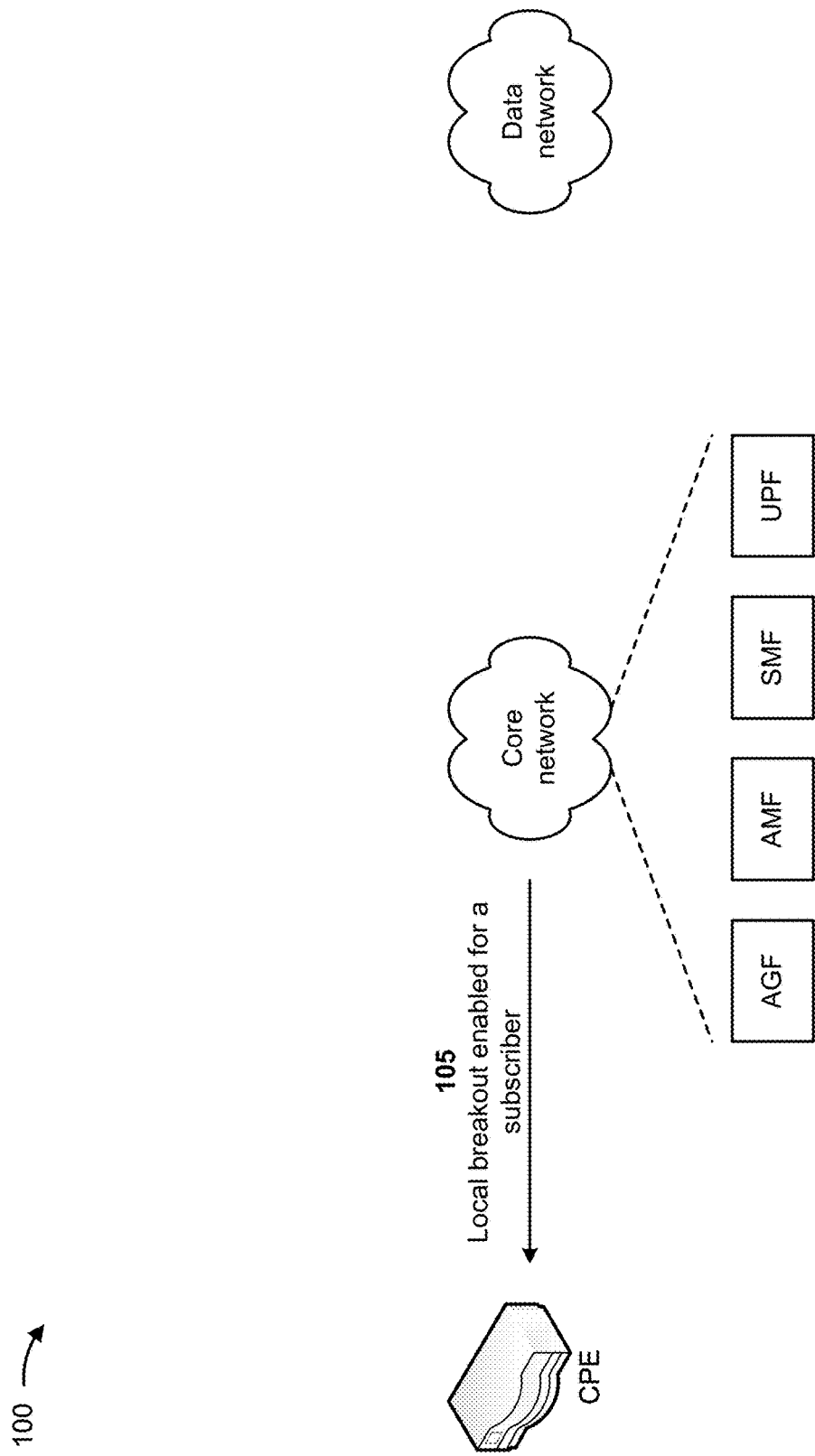
FIGS. 1A-1F are diagrams of an example associated with providing local breakout for CPE in a 5G wireless wireline convergence at an AGF.

The following detailed description of example implementations refers to the accompanying drawings. The same reference numbers in different drawings may identify the same or similar elements.

An AGF and a UPF are connected over an N3 interface (e.g., a general packet radio service (GPRS) tunneling protocol (GTP-U) tunnel) identified by a unique tunnel identifier (TEID) per subscriber. The GTP-U is used for carrying user data within a GPRS core network and between a radio access network/wireline access network and the core network. The GTP-U provides a heartbeat mechanism that is optionally enabled. In cases where the GTP-U heartbeat mechanism is not enabled, bidirectional forwarding detection (BFD) is used to detect reachability of the UPF. When the UPF is inoperable, subscriber traffic is blocked until the UPF becomes operable again or a session management function (SMF) allocates a new UPF and moves the subscriber session to the new UPF. In either case, there is a window where the subscriber traffic is completely blocked, which causes a service disruption for the subscriber. Subscriber traffic disruption may occur when the UPF is unreachable due to the N3 interface being inoperable or due to any intermediate network device between AGF and UPF being inoperable. The core network may not detect the subscriber traffic disruption when a control session is functional between the SMF and the UPF.

Subscriber traffic disruption may also occur when the UPF is inoperable. In such instances, the control session between the SMF and the UPF may be utilized to detect the inoperable UPF due to missing keepalive messages. The SMF may select an alternate UPF and may provision the subscriber for the alternate SMF. However, detecting an inoperable UPF via the control session between the SMF, an access and mobility management function (AMF), and the AGF is time consuming. The window of traffic disruption may be significant and may result in reconnection of the CPE. The traffic disruption may be significant when the network has a single UPF that is provisioned for converged subscribers, and when the SMF is unable to identify an alternate UPF (e.g., due to other UPFs executing at full capacity, inability to identify a UPF with services needed for a network slice, and/or the like). Solutions for the unreachable and/or inoperable UPF may include the CPE detecting a traffic disruption and reconnecting to the network, or the SMF detecting the inoperable or unreachable UPF, selecting a new UPF, and migrating the CPE to the new UPF. However, such solutions fail to address all types of failures associated with the UPF.

In wireless wireline convergence, if a subscriber requests (e.g., via an Internet group management protocol (IGMP) join) a multicast stream, the UPF is responsible for replicating and tunneling the multicast stream to the AGF. The AGF, in turn, relays the multicast stream to the subscriber. Such an arrangement is suboptimal when multiple subscribers request the same multicast stream. For example, the UPF replicates the multicast stream for the multiple subscribers, and each copy of the stream is tunneled (e.g., via GTP-U tunnel) to the AGF. Since the UPF and the AGF are connected over a network, each copy of the stream traverses the network with GTP-U encapsulation. Furthermore, if the UPF is inoperable or unreachable, the multicast services may be disrupted.

Thus, current techniques for handling an unreachable and/or inoperable UPF consume computing resources (e.g., processing resources, memory resources, communication resources, and/or the like), networking resources, and/or the like, associated with blocking traffic between subscribers and a network due to an unreachable and/or inoperable UPF, losing subscriber traffic due to an unreachable and/or inoperable UPF, handling lost subscriber traffic caused by an unreachable and/or inoperable UPF, and/or the like.

Some implementations described herein relate to a network device that provides local breakout for CPE in a 5G wireless wireline convergence. For example, a network device (e.g., an AGF) may enable local breakout for a subscriber device, and may create, for the subscriber device, a primary path to a data network via a UPF. The network device may create, for the subscriber device, a secondary path direct to the data network and based on the local breakout being enabled, and may determine whether a connection with the UPF is available. The network device may selectively provide traffic between the subscriber device and the data network via the primary path based on determining that the connection with the UPF is available, or may provide the traffic between the subscriber device and the data network via the secondary path based on determining that the connection with the UPF is unavailable.

In this way, the network device provides local breakout for CPE in a 5G wireless wireline convergence. For example, a network device (e.g., an AGF) may enable a local breakout for a subscriber, and may create two paths for the subscriber based on enabling the local breakout. A primary path may provide information to reach a UPF via a first network interface (e.g., an AGF mode) and a secondary path may provide information to reach a second network interface (e.g., a broadband network gateway (BNG) mode). The primary path and the secondary path may be created as a double barrel network handover to a data network for the subscriber, with the primary path being a network handover to the UPF and the secondary path being a network handover directly to the data network when the UPF is unavailable. The network device may enable a multicast local breakout for subscribers, and may receive requests for multicast data from the subscribers. The network device may store the requests for the multicast data, and may provide a single request for the multicast data to the data network. The network device may receive the multicast data based on the single request, and may replicate the multicast data to the subscribers. Thus, the network device conserves computing resources, networking resources, and/or the like that would otherwise have been consumed by blocking traffic between subscribers and a network due to an unreachable and/or inoperable UPF, losing subscriber traffic due to an unreachable and/or inoperable UPF, handling lost subscriber traffic caused by an unreachable and/or inoperable UPF, and/or the like.

FIGS. 1A-1F are diagrams of an example 100 associated with providing local breakout for CPE in a 5G wireless wireline convergence at an AGF. As shown in FIGS. 1A-1F, example 100 includes one or more CPEs (e.g., associated with subscribers), a core network, and a data network. The core network may include an AGF, an AMF, an SMF, and a UPF. Further details of the CPEs, the core network, the data network, the AGF, the AMF, the SMF, and the UPF are provided elsewhere herein.

As shown in FIG. 1A, and by reference number 105, local breakout may be enabled for a subscriber device (e.g., the CPE). A local breakout is a mechanism (e.g., an offload mechanism) for providing subscriber services at an access network without depending on a core network. For example, the AGF may include a configuration that enables a local breakout for a subscriber device (e.g., the CPE). When enabled, a control plane of the AGF may create two network handovers for the subscriber device, as described below. A primary network handover may provide information for the AGF to communicate with the UPF via an N3 interface (e.g., an AGF mode) and a secondary network handover may provide information for the AGF to communicate with the data network via an A10 interface (e.g., a BNG mode).

Figure 1B:
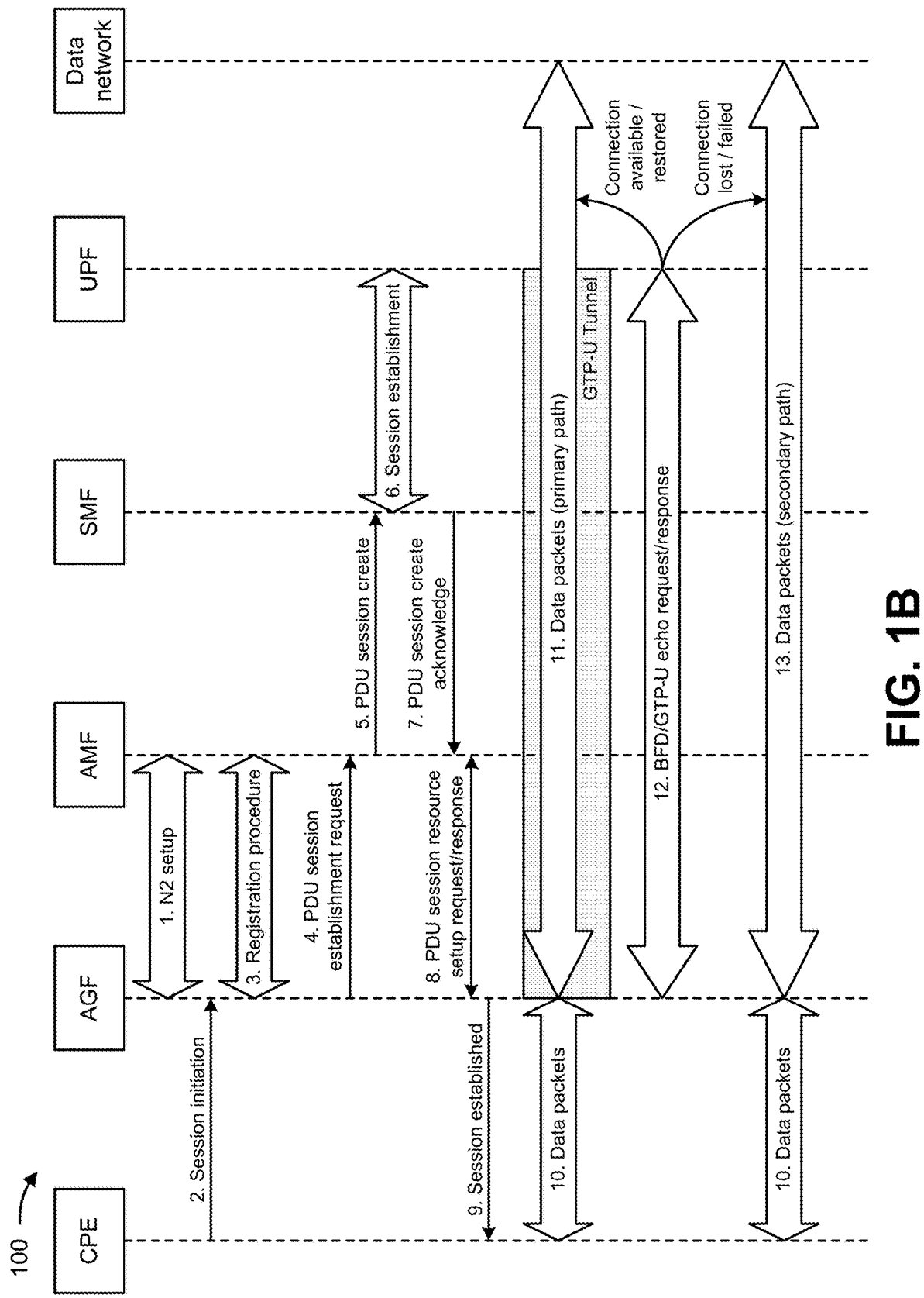

FIG. 1B is a call flow diagram associated with providing local breakout for the CPE at the AGF when a connection is restored to the UPF. As shown at step 1 of FIG. 1B, the AGF and the AMF may perform an N2 setup to select the AMF for control plane data provided to the AMF via an N2 interface. As shown at step 2, the CPE may provide a session initiation request to the AGF, and the AGF may receive the session initiation request. For example, the CPE may wish to establish a protocol data unit (PDU) session with the data network so that the CPE may communicate with the data network. As shown at steps 3 and 4, the AGF and the AMF may perform a registration procedure for the PDU session, and the AGF may provide a PDU session establishment request to the AMF. The AMF may receive the PDU session establishment request. The PDU session establishment request may include a request to establish the PDU session for the CPE with the data network.

As shown at step 5 of FIG. 1B, based on the PDU session establishment request, the AMF may generate and provide a PDU session create request to the SMF, and the SMF may receive the PDU session create request. As shown at step 6, based on the PDU session create request, the SMF and the UPF may establish the PDU session. Once the PDU session is established, the SMF may generate a PDU session create acknowledge message. As shown at step 7, the SMF may provide the PDU session create acknowledge message to the AMF, and the AMF may receive the PDU session create acknowledge message. As shown at step 8, based on receiving the PDU session create acknowledge message, the SMF may provide a PDU session resource setup request to the AGF, and the AGF may receive the PDU session resource setup request. The AGF may set up resources for the PDU session based on the PDU session resource setup request, and may generate a PDU session resource setup response indicating that the resources are set up for the PDU session.

The AGF may provide the PDU session resource setup response to the AMF and may generate a session established message indicating that the PDU session is established. As shown at step 9, the AGF may provide the session established message to the CPE and the CPE may receive the session established message.

As shown at step 10 of FIG. 1B, the CPE may provide data packets to the AGF (e.g., destined for the data network) and/or may receive data packets from the AGF (e.g., received from the data network). The AGF and the UPF may establish a GTP-U tunnel for the data packets via the N3 interface. As shown at step 11, the AGF may provide the data packets to and from the data network, via the GTP-U tunnel and the UPF (e.g., via a primary path created with the UPF). As shown at step 12, the AGF may utilize bidirectional forwarding detection (BFD) with the UPF to determine whether the connection with the UPF is available or unavailable (e.g., lost or failed) or may utilize GTP-U tunnel heartbeats (e.g., echo requests and responses) with the UPF to determine whether the connection with the UPF is available or unavailable. If the UPF is available, the AGF may provide the data packets to and from the data network, via the primary path created with the UPF. As shown at step 13, if the UPF is unavailable, the AGF may provide the data packets to and from the data network via a direct secondary path with the data network (e.g., via the N10 interface). In some implementations, the AGF may pre-provision the secondary path with the data network so that the AGF may immediately switch from the primary path to the secondary path when the UPF is unavailable.

Figure 1C:
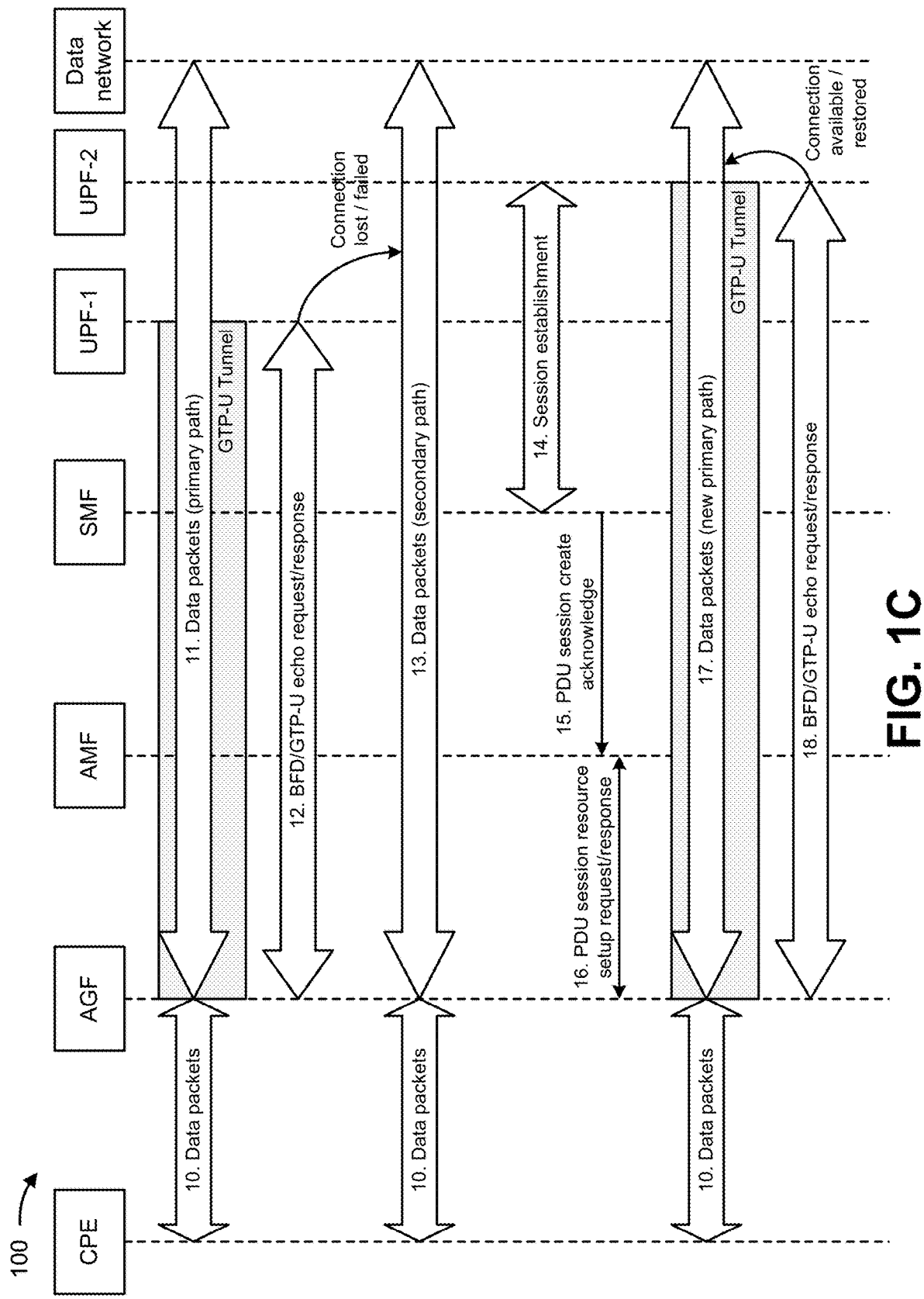

FIG. 1C is a call flow diagram associated with providing local breakout for the CPE at the AGF when the UPF is unavailable and a new UPF is allocated for the CPE. FIG. 1C continues the call flow of FIG. 1B, but includes a first UPF (UPF-1) and a second UPF (UPF-2). As shown at step 10 of FIG. 1C, the CPE may provide the data packets to the AGF and/or may receive the data packets from the AGF. As shown at step 11, the AGF may provide the data packets to and from the data network, via the GTP-U tunnel with the first UPF and the primary path. As shown at step 12, the AGF may utilize BFD with the first UPF to determine whether the connection with the first UPF is available or unavailable or may utilize GTP-U tunnel heartbeats with the first UPF to determine whether the connection with the first UPF is available or unavailable. As shown at step 13, if the first UPF is unavailable, the AGF may provide the data packets to and from the data network via the direct secondary path with the data network.

As shown at step 14 of FIG. 1C, the SMF and the second UPF may establish a new PDU session. Once the new PDU session is established, the SMF may generate a PDU session create acknowledge message. As shown at step 15, the SMF may provide the PDU session create acknowledge message to the AMF, and the AMF may receive the PDU session create acknowledge message. As shown at step 16, based on receiving the PDU session create acknowledge message, the SMF may provide a PDU session resource setup request to the AGF, and the AGF may receive the PDU session resource setup request. The AGF may set up resources for the new PDU session based on the PDU session resource setup request, and may generate a PDU session resource setup response indicating that the resources are set up for the new PDU session. The AGF may provide the PDU session resource setup response to the AMF.

As shown at step 17 of FIG. 1C, the AGF may provide the data packets to and from the data network, via the GTP-U tunnel with the second UPF and a new primary path (e.g., created with the second UPF). As shown at step 18, the AGF may utilize BFD with the second UPF to determine whether the connection with the second UPF is available or unavailable or may utilize GTP-U tunnel heartbeats with the second UPF to determine whether the connection with the second UPF is available or unavailable. If the second UPF is available, the AGF may provide the data packets to and from the data network, via the new primary path created with the second UPF.

In some implementations, if the GTP-U heartbeats are not enabled between the AGF and UPF, the AGF may enable BFD to track the reachability of the UPF. In some implementations, when the N3 interface is inoperable or the UPF becomes unreachable, the AGF may switch from the AGF mode to the BNG mode to enable subscriber traffic to be provided to the data network via the A10 interface. A subscriber route may be exported to the data network to enable the subscriber traffic to be provided to the subscriber via the A10 interface. In some implementations, the secondary path may be utilized only when the primary path is not available. Thus, implementations described herein provide an extremely fast failover mechanism for a time period when the UPF is not available. Since the secondary path is pre-provisioned, on detection of connectivity to UPF, the AGF may immediately switch to the secondary path.

Figure 1D:
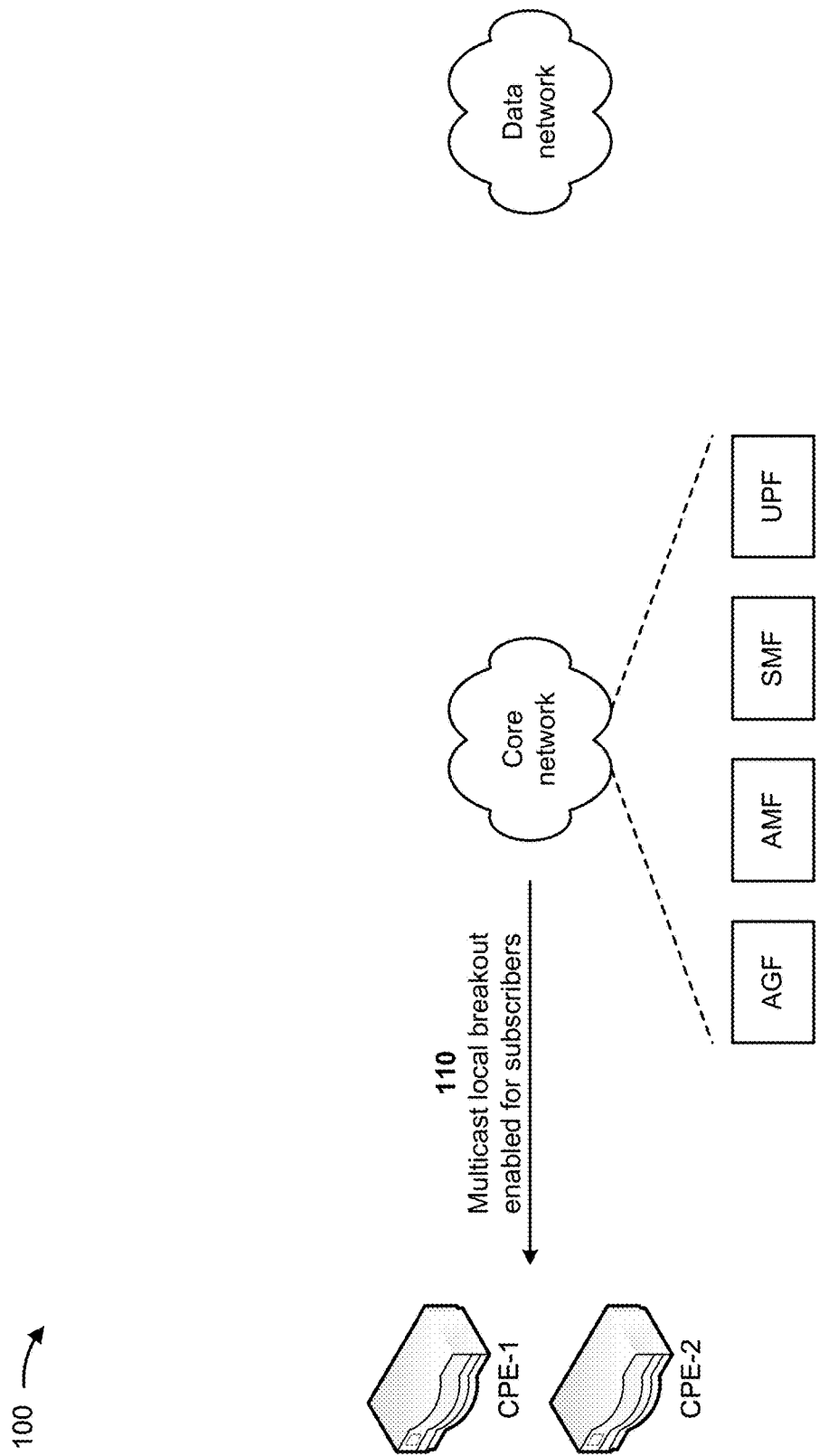

As shown in FIG. 1D, and by reference number 110, multicast local breakout may be enabled for subscriber devices (e.g., a first CPE (CPE-1) and a second CPE (CPE-2)). For example, the AGF may include a configuration that enables a multicast local breakout for subscriber devices (e.g., the first CPE and the second CPE). When enabled, the AGF may receive requests for multicast data from the subscriber devices, and may provide a single request for the multicast data to the data network. The AGF may receive the multicast data based on the single request, and may replicate the multicast data to the subscriber devices.

Figure 1E:
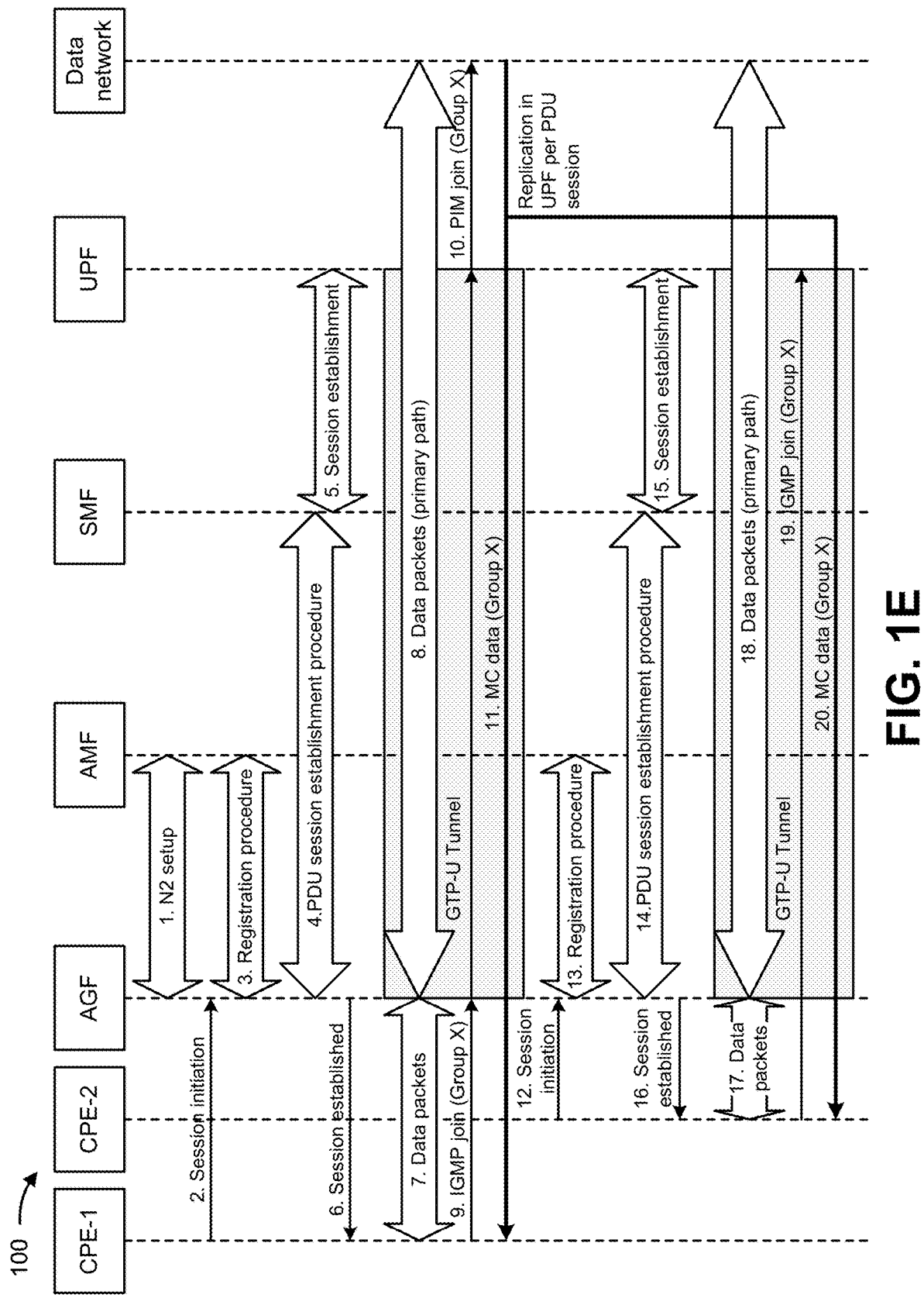

FIG. 1E is a call flow diagram associated with providing multicast local breakout for the CPEs at the AGF when the UPF is available. As shown at step 1 of FIG. 1E, the AGF and the AMF may perform an N2 setup to select the AMF for control plane data provided to the AMF via an N2 interface. As shown at step 2, the first CPE may provide a session initiation request to the AGF, and the AGF may receive the session initiation request. For example, the first CPE may wish to establish a PDU session with the data network so that the first CPE may communicate with the data network. As shown at step 3, the AGF and the AMF may perform a registration procedure for the PDU session. As shown at step 4, the AGF and the SMF may perform a PDU session establishment procedure. For example, the AGF may provide a PDU session establishment request to the AMF, and the AMF may receive the PDU session establishment request. The PDU session establishment request may include a request to establish the PDU session for the first CPE with the data network. Based on the PDU session establishment request, the AMF may generate and provide a PDU session create request to the SMF, and the SMF may receive the PDU session create request.

As shown at step 5 of FIG. 1E, based on the PDU session create request, the SMF and the UPF may establish the PDU session, as described above in connection with FIG. 1B. The AGF may generate a session established message indicating that the PDU session is established. As shown at step 6, the AGF may provide the session established message to the first CPE and the first CPE may receive the session established message. As shown at step 7, the first CPE may provide data packets to the AGF (e.g., destined for the data network) and/or may receive data packets from the AGF (e.g., received from the data network). The AGF and the UPF may establish a GTP-U tunnel for the data packets via the N3 interface. As shown at step 8, the AGF may provide the data packets to and from the data network, via the GTP-U tunnel and the UPF (e.g., via a primary path created with the UPF).

As shown at step 9 of FIG. 1E, the first CPE may generate and provide an Internet group management protocol (IGMP) join request to the AGF, and the AGF may receive the IGMP join request. The IGMP join request may include a request to receive multicast data (e.g., multicast data associated with a group of subscribers, such as Group X) from the data network. The AGF may provide the IGMP join request to the UPF, via the GTP-U tunnel, and the UPF may receive the IGMP join request. As shown at step 10, based on receiving the IGMP join request, the UPF may generate and provide a protocol independent multicast (PIM) join request to the data network. The PIM join request may include a request to receive the multicast data (e.g., the multicast data for Group X) from the data network. As shown at step 11, the data network may provide the multicast (MC) data (e.g., for Group X) to the first CPE, via the GTP-U tunnel and the UPF.

As shown at step 12 of FIG. 1E, the second CPE may provide a session initiation request to the AGF, and the AGF may receive the session initiation request. For example, the second CPE may wish to establish a PDU session with the data network so that the second CPE may communicate with the data network. As shown at step 13, the AGF and the AMF may perform a registration procedure for the PDU session. As shown at step 14, the AGF and the SMF may perform a PDU session establishment procedure. For example, the AGF may provide a PDU session establishment request to the AMF, and the AMF may receive the PDU session establishment request. The PDU session establishment request may include a request to establish the PDU session for the second CPE with the data network. Based on the PDU session establishment request, the AMF may generate and provide a PDU session create request to the SMF, and the SMF may receive the PDU session create request.

As shown at step 15 of FIG. 1E, based on the PDU session create request, the SMF and the UPF may establish the PDU session, as described above in connection with FIG. 1B. The AGF may generate a session established message indicating that the PDU session is established. As shown at step 16, the AGF may provide the session established message to the second CPE and the second CPE may receive the session established message. As shown at step 17, the second CPE may provide data packets to the AGF (e.g., destined for the data network) and/or may receive data packets from the AGF (e.g., received from the data network). The AGF and the UPF may establish a GTP-U tunnel for the data packets via the N3 interface. As shown at step 18, the AGF may provide the data packets to and from the data network, via the GTP-U tunnel and the UPF (e.g., via a primary path created with the UPF).

As shown at step 19 of FIG. 1E, the second CPE may generate and provide an IGMP join request to the AGF, and the AGF may receive the IGMP join request. The IGMP join request may include a request to receive the multicast data (e.g., the multicast data for Group X) from the data network. The AGF may provide the IGMP join request to the UPF, via the GTP-U tunnel, and the UPF may receive the IGMP join request. Based on receiving the IGMP join request, the UPF may replicate the multicast data previously received from the data network to generate a copy of the multicast data. As shown at step 20, the UPF may provide the copy of multicast data (e.g., for Group X) to the second CPE, via the GTP-U tunnel.

Figure 1F:
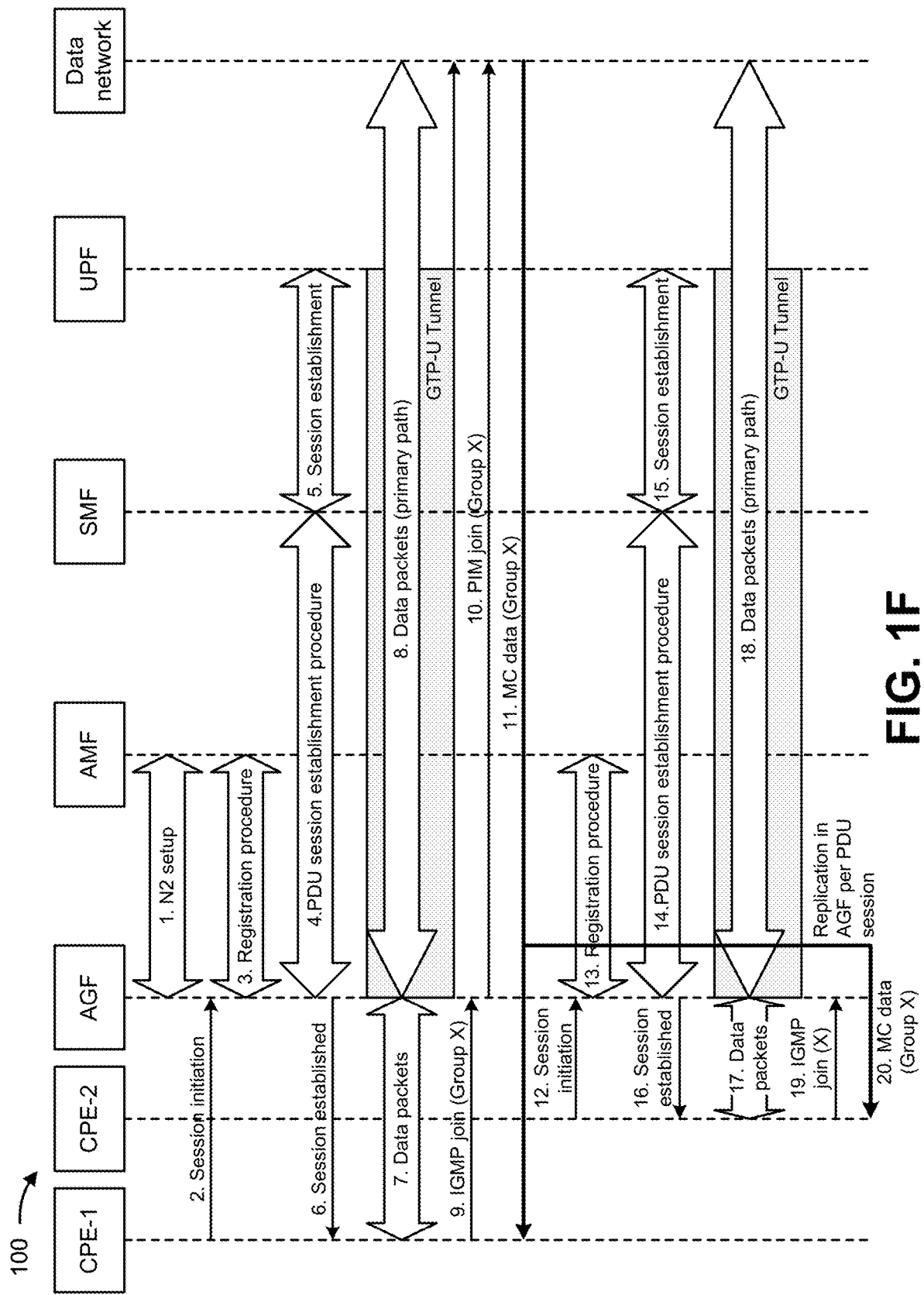

FIG. 1F is a call flow diagram associated with providing multicast local breakout for the CPEs at the AGF when the UPF is unavailable. As shown at step 1 of FIG. 1F, the AGF and the AMF may perform an N2 setup to select the AMF for control plane data provided to the AMF via an N2 interface. As shown at step 2, the first CPE may provide a session initiation request to the AGF, and the AGF may receive the session initiation request. For example, the first CPE may wish to establish a PDU session with the data network so that the first CPE may communicate with the data network. As shown at step 3, the AGF and the AMF may perform a registration procedure for the PDU session. As shown at step 4, the AGF and the SMF may perform a PDU session establishment procedure. For example, the AGF may provide a PDU session establishment request to the AMF, and the AMF may receive the PDU session establishment request. The PDU session establishment request may include a request to establish the PDU session for the first CPE with the data network. Based on the PDU session establishment request, the AMF may generate and provide a PDU session create request to the SMF, and the SMF may receive the PDU session create request.

As shown at step 5 of FIG. 1F, based on the PDU session create request, the SMF and the UPF may establish the PDU session, as described above in connection with FIG. 1B. The AGF may generate a session established message indicating that the PDU session is established. As shown at step 6, the AGF may provide the session established message to the first CPE and the first CPE may receive the session established message. As shown at step 7, the first CPE may provide data packets to the AGF (e.g., destined for the data network) and/or may receive data packets from the AGF (e.g., received from the data network). The AGF and the UPF may establish a GTP-U tunnel for the data packets via the N3 interface. As shown at step 8, the AGF may provide the data packets to and from the data network, via the GTP-U tunnel and the UPF (e.g., via a primary path created with the UPF).

As shown at step 9 of FIG. 1E, the first CPE may generate and provide an IGMP join request to the AGF, and the AGF may receive the IGMP join request. The IGMP join request may include a request to receive multicast data (e.g., multicast data associated with a group of subscribers, such as Group X) from the data network. As shown at step 10, based on receiving the IGMP join request, the AGF may generate and provide a PIM join request to the data network. The PIM join request may include a request to receive the multicast data (e.g., the multicast data for Group X) from the data network. As shown at step 11, the data network may provide the multicast data (e.g., for Group X) to the first CPE, via the AGF.

As shown at step 12 of FIG. 1F, the second CPE may provide a session initiation request to the AGF, and the AGF may receive the session initiation request. For example, the second CPE may wish to establish a PDU session with the data network so that the second CPE may communicate with the data network. As shown at step 13, the AGF and the AMF may perform a registration procedure for the PDU session. As shown at step 14, the AGF and the SMF may perform a PDU session establishment procedure. For example, the AGF may provide a PDU session establishment request to the AMF, and the AMF may receive the PDU session establishment request. The PDU session establishment request may include a request to establish the PDU session for the second CPE with the data network. Based on the PDU session establishment request, the AMF may generate and provide a PDU session create request to the SMF, and the SMF may receive the PDU session create request.

As shown at step 15 of FIG. 1F, based on the PDU session create request, the SMF and the UPF may establish the PDU session, as described above in connection with FIG. 1B. The AGF may generate a session established message indicating that the PDU session is established. As shown at step 16, the AGF may provide the session established message to the second CPE and the second CPE may receive the session established message. As shown at step 17, the second CPE may provide data packets to the AGF (e.g., destined for the data network) and/or may receive data packets from the AGF (e.g., received from the data network). The AGF and the UPF may establish a GTP-U tunnel for the data packets via the N3 interface. As shown at step 18, the AGF may provide the data packets to and from the data network, via the GTP-U tunnel and the UPF (e.g., via a primary path created with the UPF).

As shown at step 19 of FIG. 1E, the second CPE may generate and provide an IGMP join request to the AGF, and the AGF may receive the IGMP join request. The IGMP join request may include a request to receive the multicast data (e.g., the multicast data for Group X) from the data network. Based on receiving the IGMP join request, the AGF may replicate the multicast data previously received from the data network to generate a copy of the multicast data. As shown at step 20, the AGF may provide the copy of multicast data (e.g., for Group X) to the second CPE.

In some implementations, the AGF may receive IGMP join requests from the subscriber devices, and may generate respective PIM join requests that are provided to the data network. In some implementations, the multicast data may be directly received by the AGF, from the data network, and not via the UPF. The AGF, based on a table identifying the received IGMP join requests, may replicate the multicast data and may provide the replicated multicast data to the subscriber devices. The AGF may cache the IGMP join requests, may provide a single PIM join request to the data network, and may replicate the multicast data for subscriber devices that requested the multicast data. Implementations described herein provide an efficient way of utilizing network bandwidth between the AGF and the UPF, and reduce a load on the UPF. Multicast data replication may be performed close to an access network, which may be the most efficient. In some implementations, the multicast local breakout may be enabled for the AGF only when the UPF is not reachable.

In this way, the network device provides local breakout for CPE in a 5G wireless wireline convergence. For example, a network device (e.g., an AGF) may enable a local breakout for a subscriber, and may create two paths for the subscriber based on enabling the local breakout. A primary path may provide information to reach a UPF via a first network interface (e.g., an AGF mode) and a secondary path may provide information to reach a second network interface (e.g., a BNG mode). The primary path and the secondary path may be created as a double barrel network handover to a data network for the subscriber, with the primary path being a network handover to the UPF and the secondary path being a network handover directly to the data network when the UPF is unavailable. The network device may enable a multicast local breakout for subscribers, and may receive requests for multicast data from the subscribers. The network device may store the requests for the multicast data, and may provide a single request for the multicast data to the data network. The network device may receive the multicast data based on the single request, and may replicate the multicast data to the subscribers. Thus, the network device conserves computing resources, networking resources, and/or the like that would otherwise have been consumed by blocking traffic between subscribers and a network due to an unreachable and/or inoperable UPF, losing subscriber traffic due to an unreachable and/or inoperable UPF, handling lost subscriber traffic caused by an unreachable and/or inoperable UPF, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
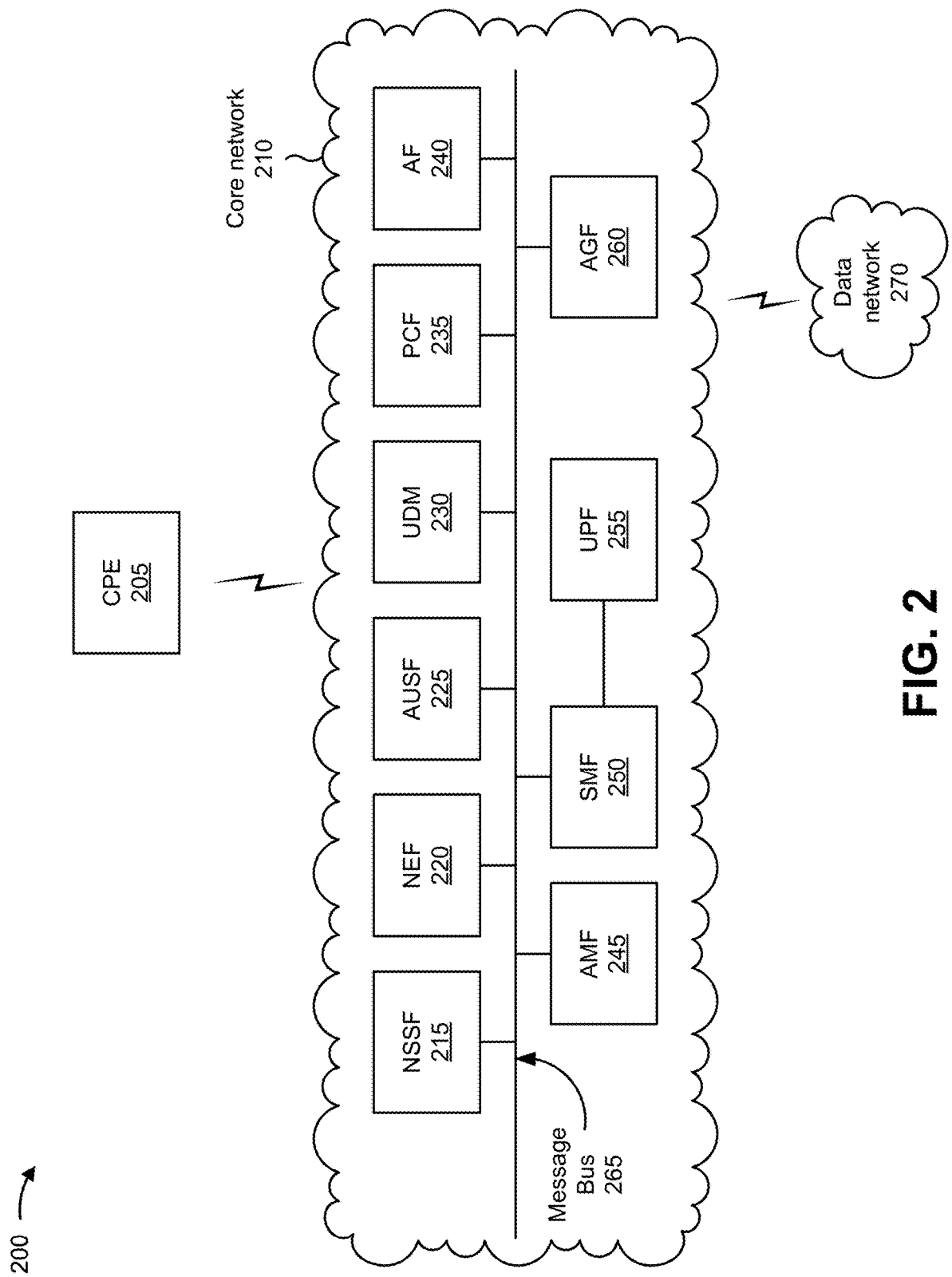
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include a CPE 205, a core network 210, and a data network 270. Devices and/or networks of the example environment 200 may interconnect via wired connections, wireless connections, or a combination of wired and wireless connections.

The CPE 205 may include one or more devices capable of receiving, processing, storing, routing, and/or providing traffic (e.g., a packet and/or other information or metadata) in a manner described herein. For example, the CPE 205 may include a router, such as a label switching router (LSR), a label edge router (LER), an ingress router, an egress router, a provider router (e.g., a provider edge router or a provider core router), a virtual router, or another type of router. Additionally, or alternatively, the CPE 205 may include a gateway, a switch, a firewall, a hub, a bridge, a reverse proxy, a server (e.g., a proxy server, a cloud server, or a data center server), a load balancer, and/or a similar device. In some implementations, the CPE 205 may be a physical device implemented within a housing, such as a chassis. In some implementations, the CPE 205 may be a virtual device implemented by one or more computing devices of a cloud computing environment or a data center. In some implementations, a group of CPEs 205 may be a group of data center nodes that are used to route traffic flow through a network.

In some implementations, the core network 210 may include an example functional architecture in which systems and/or methods described herein may be implemented. For example, the core network 210 may include an example architecture of a fifth generation (5G) next generation (NG) core network included in a 5G wireless telecommunications system. While the example architecture of the core network 210 shown in FIG. 2 may be an example of a service-based architecture, in some implementations, the core network 210 may be implemented as a reference-point architecture and/or a 4G core network, among other examples.

As shown in FIG. 2, the core network 210 may include a number of functional elements. The functional elements may include, for example, a network slice selection function (NSSF) 215, a network exposure function (NEF) 220, an authentication server function (AUSF) 225, a unified data management (UDM) component 230, a policy control function (PCF) 235, an application function (AF) 240, an AMF 245, an SMF 250, a UPF 255, and/or an AGF 260. These functional elements may be communicatively connected via a message bus 265. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 215 includes one or more devices that select network slice instances for the CPE 215. By providing network slicing, the NSSF 215 allows an operator to deploy multiple substantially independent end-to-end networks potentially with the same infrastructure. In some implementations, each slice may be customized for different services.

The NEF 220 includes one or more devices that support exposure of capabilities and/or events in the wireless telecommunications system to help other entities in the wireless telecommunications system discover network services.

The AUSF 225 includes one or more devices that act as an authentication server and support the process of authenticating the CPE 205 in the wireless telecommunications system.

The UDM 230 includes one or more devices that store user data and profiles in the wireless telecommunications system. The UDM 230 may be used for fixed access and/or mobile access in the core network 210.

The PCF 235 includes one or more devices that provide a policy framework that incorporates network slicing, roaming, packet processing, and/or mobility management, among other examples.

The AF 240 includes one or more devices that support application influence on traffic routing, access to the NEF 220, and/or policy control, among other examples.

The AMF 245 includes one or more devices that act as a termination point for non-access stratum (NAS) signaling and/or mobility management, among other examples.

The SMF 250 includes one or more devices that support the establishment, modification, and release of communication sessions in the wireless telecommunications system. For example, the SMF 250 may configure traffic steering policies at the UPF 255 and/or may enforce user equipment Internet protocol (IP) address allocation and policies, among other examples.

The UPF 255 includes one or more devices that serve as an anchor point for intra-RAT and/or inter-RAT mobility. The UPF 255 may apply rules to packets, such as rules pertaining to packet routing, traffic reporting, and/or handling user plane QoS, among other examples.

The AGF 260 includes one or more devices that provide provides authentication, authorization, and accounting (AAA) services and hierarchical traffic shaping and policing for fixed network and 5G residential gateways (e.g., the CPE 205) being served from the UPF 255.

The message bus 265 represents a communication structure for communication among the functional elements. In other words, the message bus 265 may permit communication between two or more functional elements.

The data network 270 includes one or more wired and/or wireless data networks. For example, the data network 270 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
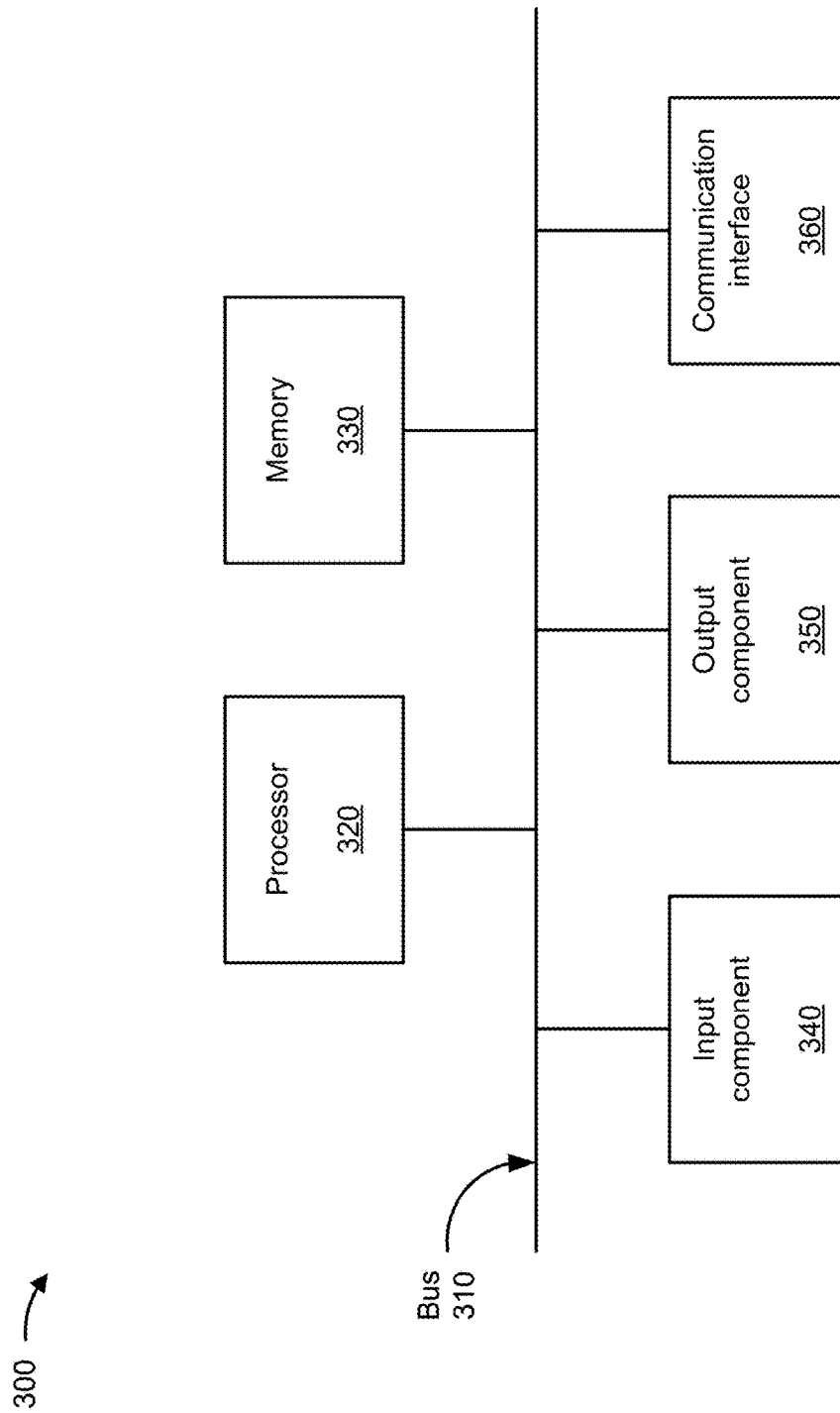
FIGS. 3 and 4 are diagrams of example components of one or more devices of FIG. 2.

FIG. 3 is a diagram of example components of one or more devices of FIG. 2. The example components may be included in a device 300, which may correspond to the CPE 205, the NSSF 215, the NEF 220, the AUSF 225, the UDM component 230, the PCF 235, the AF 240, the AMF 245, the SMF 250, the UPF 255, and/or the AGF 260. In some implementations, the CPE 205, the NSSF 215, the NEF 220, the AUSF 225, the UDM component 230, the PCF 235, the AF 240, the AMF 245, the SMF 250, the UPF 255, and/or the AGF 260 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit (CPU), a graphics processing unit (GPU), an accelerated processing unit (APU), a microprocessor, a controller, a microcontroller, a digital signal processor (DSP), a field-programmable gate array (FPGA), an application-specific integrated circuit (ASIC), and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
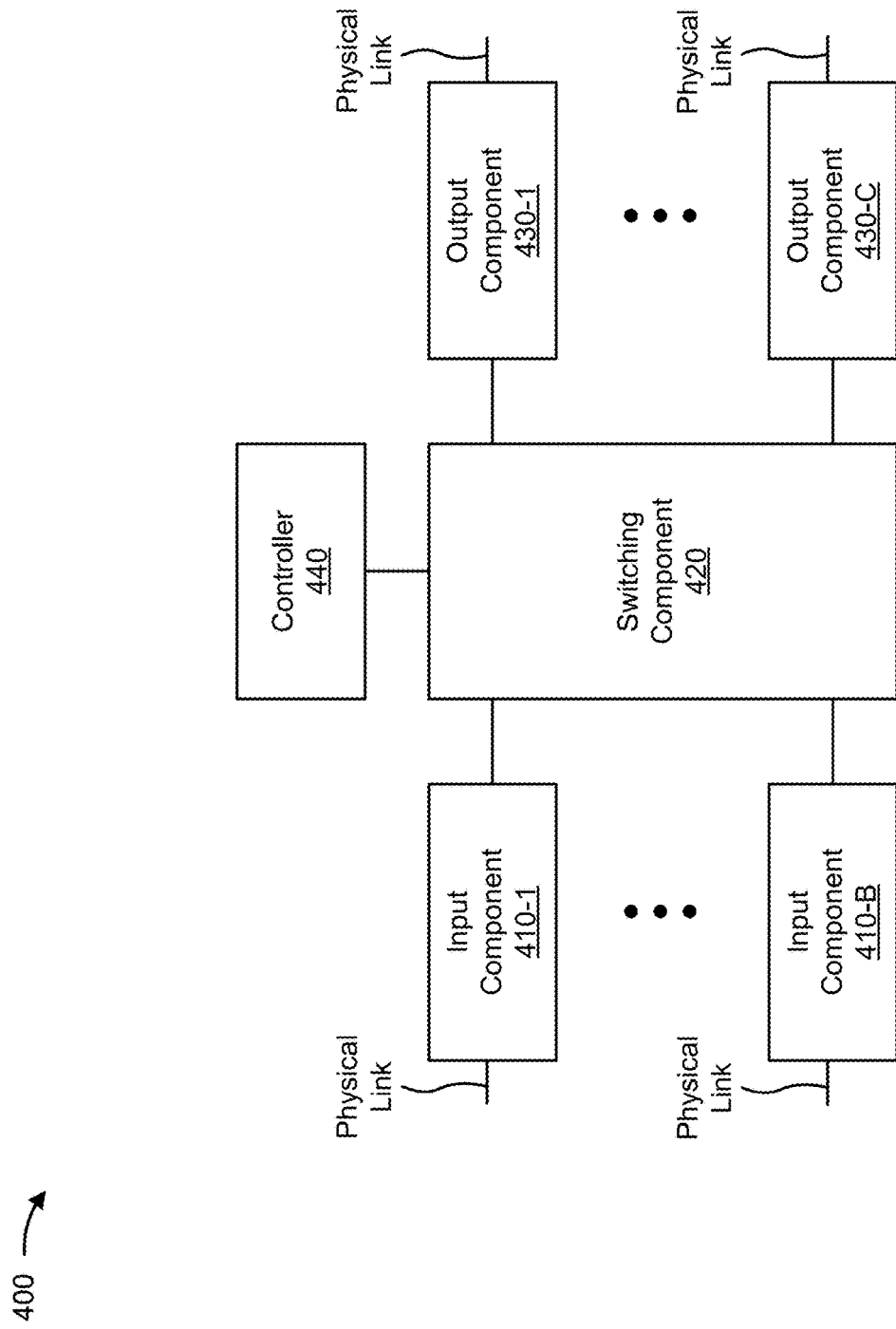

FIG. 4 is a diagram of example components of one or more devices of FIG. 2. The example components may be included in a device 400. The device 400 may correspond to the CPE 205, the NSSF 215, the NEF 220, the AUSF 225, the UDM component 230, the PCF 235, the AF 240, the AMF 245, the SMF 250, the UPF 255, and/or the AGF 260. In some implementations, the CPE 205, the NSSF 215, the NEF 220, the AUSF 225, the UDM component 230, the PCF 235, the AF 240, the AMF 245, the SMF 250, the UPF 255, and/or the AGF 260 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for providing local breakout for CPE in a 5G wireless wireline convergence at an AGF. In some implementations, one or more process blocks of FIG. 5 may be performed by a network device (e.g., the AGF 260). In some implementations, one or more process blocks of FIG. 5 may be performed by another device or a group of devices separate from or including the network device, such as a UPF (e.g., the UPF 255). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include enabling local breakout for a subscriber device (block 510). For example, the network device may enable local breakout for a subscriber device, as described above. In some implementations, the network device is an AGF.

As further shown in FIG. 5, process 500 may include creating, for the subscriber device, a primary path to a data network via a UPF (block 520). For example, the network device may create, for the subscriber device, a primary path to a data network via a UPF, as described above. In some implementations, creating the primary path includes creating the primary path between the network device and the UPF via a first network interface. In some implementations, the primary path includes a GTP tunnel between the network device and the UPF.

As further shown in FIG. 5, process 500 may include creating, for the subscriber device, a secondary path direct to the data network and based on the local breakout being enabled (block 530). For example, the network device may create, for the subscriber device, a secondary path direct to the data network and based on the local breakout being enabled, as described above. In some implementations, creating the secondary path includes creating the secondary path between the network device and the data network via a second network interface that is different than the first network interface. In some implementations, the primary path is associated with an N3 interface and the secondary path is associated with an A10 interface. In some implementations, creating the secondary path includes pre-provisioning the secondary path between the network device and the data network.

As further shown in FIG. 5, process 500 may include determining whether a connection with the UPF is available (block 540). For example, the network device may determine whether a connection with the UPF is available, as described above. In some implementations, determining whether the connection with the UPF is available includes utilizing bidirectional forwarding detection with the UPF to determine whether the connection with the UPF is available. In some implementations, determining whether the connection with the UPF is available includes one of determining that the connection with the UPF is available based on an interface with the UPF being operable and the UPF being reachable, or determining that the connection with the UPF is unavailable based on the interface with the UPF being inoperable or the UPF being unreachable. In some implementations, determining whether the connection with the UPF is available includes utilizing GTP tunnel heartbeats with the UPF to determine whether the connection with the UPF is available.

As further shown in FIG. 5, process 500 may include selectively providing traffic between the subscriber device and the data network via the primary path based on determining that the connection with the UPF is available, or providing the traffic between the subscriber device and the data network via the secondary path based on determining that the connection with the UPF is unavailable (block 550). For example, the network device may selectively provide traffic between the subscriber device and the data network via the primary path based on determining that the connection with the UPF is available, or may provide the traffic between the subscriber device and the data network via the secondary path based on determining that the connection with the UPF is unavailable, as described above.

In some implementations, process 500 includes creating, for the subscriber device, another primary path to the data network via another UPF, and providing the traffic between the subscriber device and the data network, via the other primary path and instead of the secondary path, based on determining that the connection with the UPF is unavailable. In some implementations, creating the other primary path includes creating the other primary path between the network device and the other UPF via a network interface. In some implementations, the other primary path includes a GTP tunnel between the network device and the other UPF.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    enabling, by a network device, local breakout for a subscriber device;
    creating, by the network device and for the subscriber device, a primary path to a data network via a user plane function;
    creating, by the network device and for the subscriber device, a secondary path direct to the data network and based on the local breakout being enabled;
    determining, by the network device, whether a connection with the user plane function is available; and
    selectively:
        providing, by the network device, traffic between the subscriber device and the data network via the primary path based on determining that the connection with the user plane function is available; or
        providing, by the network device, the traffic between the subscriber device and the data network via the secondary path based on determining that the connection with the user plane function is unavailable.

2. The method of claim 1, wherein creating the primary path comprises:
    creating the primary path between the network device and the user plane function via a first network interface.

3. The method of claim 2, wherein creating the secondary path comprises:
    creating the secondary path between the network device and the data network via a second network interface that is different than the first network interface.

4. The method of claim 1, wherein determining whether the connection with the user plane function is available comprises:
    utilizing bidirectional forwarding detection with the user plane function to determine whether the connection with the user plane function is available.

5. The method of claim 1, wherein determining whether the connection with the user plane function is available comprises one of:
    determining that the connection with the user plane function is available based on an interface with the user plane function being operable and the user plane function being reachable; or
    determining that the connection with the user plane function is unavailable based on the interface with the user plane function being inoperable or the user plane function being unreachable.

6. The method of claim 1, wherein the primary path includes a general packet radio service tunneling protocol tunnel between the network device and the user plane function.

7. The method of claim 1, wherein the network device is an access gateway function.

8. A network device, comprising:
    one or more memories; and
    one or more processors to:
        enable local breakout for a subscriber device;
        create, for the subscriber device, a primary path to a data network via a user plane function,
            wherein the primary path includes a general packet radio service tunneling protocol tunnel between the network device and the user plane function;
        create, for the subscriber device, a secondary path direct to the data network and based on the local breakout being enabled;
        determine whether a connection with the user plane function is available; and
        selectively:
            provide traffic between the subscriber device and the data network via the primary path based on determining that the connection with the user plane function is available; or
            provide the traffic between the subscriber device and the data network via the secondary path based on determining that the connection with the user plane function is unavailable.

9. The network device of claim 8, wherein the one or more processors are further to:
    create, for the subscriber device, another primary path to the data network via another user plane function; and
    provide the traffic between the subscriber device and the data network, via the other primary path and instead of the secondary path, based on determining that the connection with the user plane function is unavailable.

10. The network device of claim 9, wherein the one or more processors, to create the other primary path, are to:
    create the other primary path between the network device and the other user plane function via a network interface.

11. The network device of claim 9, wherein the other primary path includes a general packet radio service tunneling protocol tunnel between the network device and the other user plane function.

12. The network device of claim 8, wherein the one or more processors, to determine whether the connection with the user plane function is available, are to:
utilize general packet radio service tunneling protocol tunnel heartbeats with the user plane function to determine whether the connection with the user plane function is available.

13. The network device of claim 8, wherein the primary path is associated with an N3 interface and the secondary path is associated with an A10 interface.

14. The network device of claim 8, wherein the one or more processors, to create the secondary path, are to:
pre-provision the secondary path between the network device and the data network.

15. A non-transitory computer-readable medium storing a set of instructions, the set of instructions comprising:
one or more instructions that, when executed by one or more processors of a network device, cause the network device to:
enable local breakout for a subscriber device;
create, for the subscriber device, a primary path to a data network via a user plane function and a first network interface;
create, for the subscriber device, a secondary path direct to the data network via a second network interface different than the first network interface and based on the local breakout being enabled;
determine whether a connection with the user plane function is available; and
selectively:
provide traffic between the subscriber device and the data network via the primary path based on determining that the connection with the user plane function is available; or
provide the traffic between the subscriber device and the data network via the secondary path based on determining that the connection with the user plane function is unavailable.

16. The non-transitory computer-readable medium of claim 15, wherein the one or more instructions, that cause the network device to determine whether the connection with the user plane function is available, cause the network device to one of:
utilize bidirectional forwarding detection with the user plane function to determine whether the connection with the user plane function is available; or
utilize general packet radio service tunneling protocol tunnel heartbeats with the user plane function to determine whether the connection with the user plane function is available.

17. The non-transitory computer-readable medium of claim 15, wherein the one or more instructions, that cause the network device to determine whether the connection with the user plane function is available, cause the network device to one of:
determine that the connection with the user plane function is available based on an interface with the user plane function being operable and the user plane function being reachable; or
determine that the connection with the user plane function is unavailable based on the interface with the user plane function being inoperable or the user plane function being unreachable.

18. The non-transitory computer-readable medium of claim 15, wherein the one or more instructions further cause the network device to:
create, for the subscriber device, another primary path to the data network via another user plane function; and
provide the traffic between the subscriber device and the data network, via the other primary path and instead of the secondary path, based on determining that the connection with the user plane function is unavailable.

19. The non-transitory computer-readable medium of claim 18, wherein the one or more instructions, that cause the network device to create the other primary path, cause the network device to:
create the other primary path between the network device and the other user plane function via a network interface.

20. The non-transitory computer-readable medium of claim 18, wherein the other primary path includes a general packet radio service tunneling protocol tunnel between the network device and the other user plane function.

* * * * *